(12) United States Patent
Ammar et al.

(10) Patent No.: US 7,046,959 B2
(45) Date of Patent: May 16, 2006

(54) MMIC TRANSCEIVER AND LOW COST SUBHARMONICALLY DRIVEN MICROWAVE RECEIVER

(75) Inventors: Danny F. Ammar, Windermere, FL (US); Stephen A. Stahly, Orlando, FL (US)

(73) Assignee: Xytrans, Inc., Orlando, FL (US)

( * ) Notice: Subject to any disclaimer, the term of this patent is extended or adjusted under 35 U.S.C. 154(b) by 511 days.

(21) Appl. No.: 10/337,968

(22) Filed: Jan. 7, 2003

(65) Prior Publication Data

US 2004/0048588 A1  Mar. 11, 2004

Related U.S. Application Data

(63) Continuation-in-part of application No. 10/301,511, filed on Nov. 21, 2002.

(60) Provisional application No. 60/408,513, filed on Sep. 5, 2002.

(51) Int. Cl.
*H04B 7/185* (2006.01)

(52) U.S. Cl. .................... 455/13.1; 455/3.01; 455/12.1
(58) Field of Classification Search .............. 455/3.02, 455/12.1, 13.1; 342/354; 333/247, 204
See application file for complete search history.

(56) References Cited

U.S. PATENT DOCUMENTS

| | | | |
|---|---|---|---|
| 4,884,208 A | 11/1989 | Marinelli et al. ........... 364/460 |
| 5,239,685 A * | 8/1993 | Moe et al. .................... 455/73 |
| 5,270,673 A * | 12/1993 | Fries et al. ................. 333/246 |
| 5,511,079 A | 4/1996 | Dillon .......................... 371/43 |
| 5,671,220 A | 9/1997 | Tonomura .................... 370/281 |
| 6,040,739 A * | 3/2000 | Wedeen et al. ............... 330/66 |
| 6,072,991 A * | 6/2000 | Paul et al. .................... 455/73 |
| 6,204,822 B1 | 3/2001 | Cardiasmenos et al. .... 343/761 |
| 6,212,360 B1 | 4/2001 | Fleming, III et al. ...... 455/13.4 |
| 6,366,620 B1 | 4/2002 | Jackson et al. ............. 375/308 |
| 2001/0013133 A1 | 8/2001 | Harrison ..................... 725/121 |
| 2002/0098803 A1 | 7/2002 | Poulton et al. ............ 455/13.1 |
| 2002/0144392 A1 | 10/2002 | John et al. .................... 29/600 |

* cited by examiner

*Primary Examiner*—Tilahun Gesesse
(74) *Attorney, Agent, or Firm*—Allen, Dyer, Doppelt, Milbrath & Gilchrist, P.A.

(57) ABSTRACT

A receiver is operable at microwave frequencies and includes a substrate and waveguide-to-microstrip transition formed on the substrate for receiving microwave radio frequency (RF) signals. Surface mounted receiver components are interconnected with microstrip formed on the substrate and receive the RF signals from the waveguide-to-microstrip transition and convert the signal to an intermediate frequency (IF) for further processing. The surface mounted receiver components include a mixer circuit that receives a local oscillator (LO) signal and RF signal to produce the IF signal. A diplexer circuit and a temperature compensated attenuator circuit received the IF signal from the mixer and attenuates the IF signal to provide high signal linearity and high order modulation.

18 Claims, 14 Drawing Sheets

MMIC TRANSCEIVER AND LOW COST SUBHARMONICALLY DRIVEN MICROWAVE RECEIVER

RELATED APPLICATION

This application is a continuation-in-part application of patent application Ser. No. 10/301,511, filed Nov. 21, 2002, and entitled "LOW COST VSAT MMIC TRANSCEIVER WITH AUTOMATIC POWER CONTROL," which is based upon prior filed provisional application Ser. No. 60/408,513, filed Sep. 5, 2002, the disclosures which are hereby incorporated by reference in their entirety.

FIELD OF THE INVENTION

This invention relates to the field of communications, and more particularly, this invention relates to the field of microwave receivers.

BACKGROUND OF THE INVENTION

In the early days of satellite communications, there were few downlink earth stations and those in existence were essentially large antenna dishes operative with wired communications hubs. Any signals received at these large earth stations were distributed through wires and cables to numerous destinations and even other communications hubs. Thus, many earth stations were positioned in metropolitan areas and acted as communications hubs, and distributed communication signals often in a broadcast fashion to other hubs, regional centers, or local sites via cable. It was not convenient to have a large number of smaller, earth station terminals.

This scenario changed with the advent of very small aperture terminal (VSAT) communications systems or networks. These VSAT systems are cost-effective communications networks that allow many smaller VSAT terminals to be geographically dispersed and located in many different areas, including rural and metropolitan areas. VSAT networks support internet, voice/fax, data, LAN and many other communication formats.

A VSAT network usually includes a large central earth station known as a central hub (or master earth station), a satellite transponder, and a large number of geographically disbursed, remote VSATs. The satellites are positioned in a geostationary orbit about 36,000 kilometers above the earth. A VSAT terminal receives and transmits signals via the satellite to other VSATs in the network. The term "very small" used in the VSAT name refers to the small antenna dish that typically is about 3 to about 6 feet in diameter and could be mounted in almost any location, such as a roof, building wall, or on the ground. The VSAT terminal has an outdoor unit (ODU) that includes an antenna, low noise blocker (LSB) in some instances, and a VSAT transceiver as part of the outdoor electronics and other components. The antenna usually includes an antenna reflector, feed horn and an antenna mount or frame. The outdoor electronics constitute part of the outdoor unit and include low noise amplifiers (LNA) and other transceiver components, such as a millimeter wave (MMW) transceiver.

The indoor unit (IDU) can be an interface, such as a desktop box or PC, that contains the electronics for interfacing and communicating with existing in-house equipment such as local area networks, servers, PCs and other equipment. The indoor unit is usually connected to the outdoor unit with a pair of cables, e.g., coaxial cable. Indoor units also include basic demodulators and modulators.

In the next few years a number of Ka-band (27.5 to 30 GHz) satellites will be launched that will enable remote Internet access via 2-way communication with user terminals. To successfully compete with other Internet services such as Digital Subscriber Line (DSL) and cable modem, the cost of very small aperture terminals (VSATs) must be reduced to a low level. As noted before, each very small aperture terminal typically includes an antenna, a diplexer, and a millimeter wave (MMW) transceiver. In many current VSAT designs, the MMW transceiver circuit accounts for almost 75% of the total cost of a VSAT terminal. Unlike the lower frequency Ku-band transceivers, which can be built from low cost discrete components using low cost soft board, such as Rogers board, a Ka-band transceiver requires much tighter tolerances because of its inherent shorter wavelength. One current method pursued by many manufacturers is to pre-package the Ka-band MMIC chips in surface mount packages using traditional surface mount technology (SMT) assembly methods. Although this method is widely used, it has not been very successful at driving down the costs of VSATs because the packaging of MMIC's and the required tuning after assembly has been expensive.

In addition to the cost issue, as the number of VSAT terminals increases (to perhaps millions of units in the next few years), the amount of power transmitted from the ground unit (VSAT terminal) to the satellite transponders will have to be better controlled. Most VSAT terminals require low power to operate in clear weather. High power is only required to overcome weather and maintain a high rate of service availability. Continuously "blasting", i.e., transmitting high power signals, will also reduce the transceiver reliability as maximum heat is constantly generated, shortening component life.

The invention in the copending Ser. No. 10/301,511 patent application solves these aforementioned problems associated with prior art very small aperture terminal (VSAT) terminals. In that invention, a low cost Ka-band VSAT terminal includes a VSAT transceiver that automatically controls the amount of power transmitted from each very small aperture VSAT terminal as a function of weather conditions. That invention offered several advantages, including a low cost microcontrolled VSAT transceiver that uses a microprocessor to provide optimum two-way communications with a satellite of the space segment.

A ceramic substrate board is preferably formed from a ceramic material, such as 95% to 96% alumina, for mounting Ka-band high frequency microwave monolithic integrated circuit (MMIC) chips, filters, and other low cost surface mount components, but advantageously uses a soft board (controller board) for low frequency circuits and the microcontroller to improve circuit operation and ease of manufacturing. That transceiver detects and measures the received signal strength (RSS) and through the microcontroller, estimates the amount of atmospheric attenuation. In response, the microcontroller autonomously and automatically adjusts the transmitter power sufficiently to overcome the atmospheric attenuation and provide adequate reception by the satellite. The microcontroller can also manage the DC power consumption to reduce thermal heating and improve reliability. The microcontroller enhances this circuit function with a unique structure that is advantageous, inexpensive and reliable.

The VSAT terminal typically operates at frequencies greater than 13 GHz and higher than 20 GHz. Some prior art receiver circuits used in this microwave technology have required die formed semiconductors on alumina or similar hard substrates and complicated mixer designs such as diodes in a balance configuration. It would also be advantageous if the circuits could provide high signal linearity and isolation to support high order modulation.

SUMMARY OF THE INVENTION

The present invention provides a subharmonically driven microwave receiver that could be used in a VSAT or other microwave device and is especially advantageous at microwave frequencies above 13 GHz and operable adequately at 20 GHz and higher. The present invention provides a high linearity receiver that uses inexpensive surface mounted components in an innovative circuit configuration to achieve wide bandwidths at a low cost. The present invention also provides a unique circuit for subharmonically driven active field effect transistor. The present invention can be used efficiently at 20 GHz with load noise using the inexpensive surface mount parts or components. Naturally, it is operable at higher frequencies for complete VSAT operation in some instances. The invention uses inexpensive surface mount parts and substrate materials to compensate for the degraded performance of packaged semiconductors at microwave frequencies. The compensation covers both broadband amplitude performance versus frequency and gain stabilization as a function of temperature. The receiver circuit of the present invention has a low loss waveguide transition to achieve a noise figure of about 2 decibels at 20 GHz and above. It has high signal linearity and isolation to support high order modulation. It also is operable at a temperature range exceeding 100° C.

In accordance with the present invention, the receiver is operable at microwave frequencies and includes a substrate and waveguide-to-microstrip transition formed on the substrate for receiving microwave radio frequency (RF) signals. Surface mounted receiver components and interconnecting microstrip are formed on the substrate and receive the RF signals from the waveguide-to-microstrip transition and convert the signal to an intermediate frequency (IF) for further processing. A mixer circuit receives a local oscillator (LO) signal and RF signal to produce the IF signal. A diplexer circuit and a temperature compensated attenuator circuit receive the IF signal from the mixer and attenuates the IF signal to provide high signal linearity and high order modulation.

In yet another aspect of the present invention, the diplexer circuit receives the IF signal from the mixer circuit and passes the signal to the temperature compensated attenuator circuit. A gain equalizer circuit can receive the IF signal from the temperature compensated attenuator circuit and provide equalization of the gain. A controller and temperature compensation circuit is operatively connected to the temperature compensated attenuator circuit and temperature compensates any attenuations to the IF signal. A received signal strength indicator (RSSI) circuit couples a portion of the IF signal after the diplexer and temperature compensated attenuator circuit and is operatively connected to the controller for allowing the controller to adjust circuit operation and ensure high signal linearity and high order modulation. The amplifier circuit amplifies the IF signal before passing through the diplexer circuit and temperature compensated attenuator circuit. The amplifier circuit receives the IF signal after passing through the diplexer circuit and temperature compensated attenuator circuit.

The waveguide-to-microstrip transition can comprise a metallic housing, ground layer thereon, substrate over the ground layer, and backshort and microstrip line operatively formed as a waveguide launch. The microstrip line can further comprise copper having a thinner nickel layer on at least a portion of the copper. Ground vias can extend around the backshort to aid in the transition. Naturally, the receiver is operable as a VSAT transceiver.

In yet another aspect of the present invention, a local oscillator circuit generates the local oscillator signal that passes through a low pass filter into the mixer. A bandpass filter receives the RF signal and passes the signal after bandpass through the mixer circuit. The mixer can further comprise a field effect transistor (FET) and gate bias circuit and drain bias circuit connected thereto and forming a mixer output of the drain and connected to the diplexer circuit and temperature compensated attenuator circuit. The surface mounted receiver components can be operable as a harmonic load at the output of the field effect transistor.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1A:
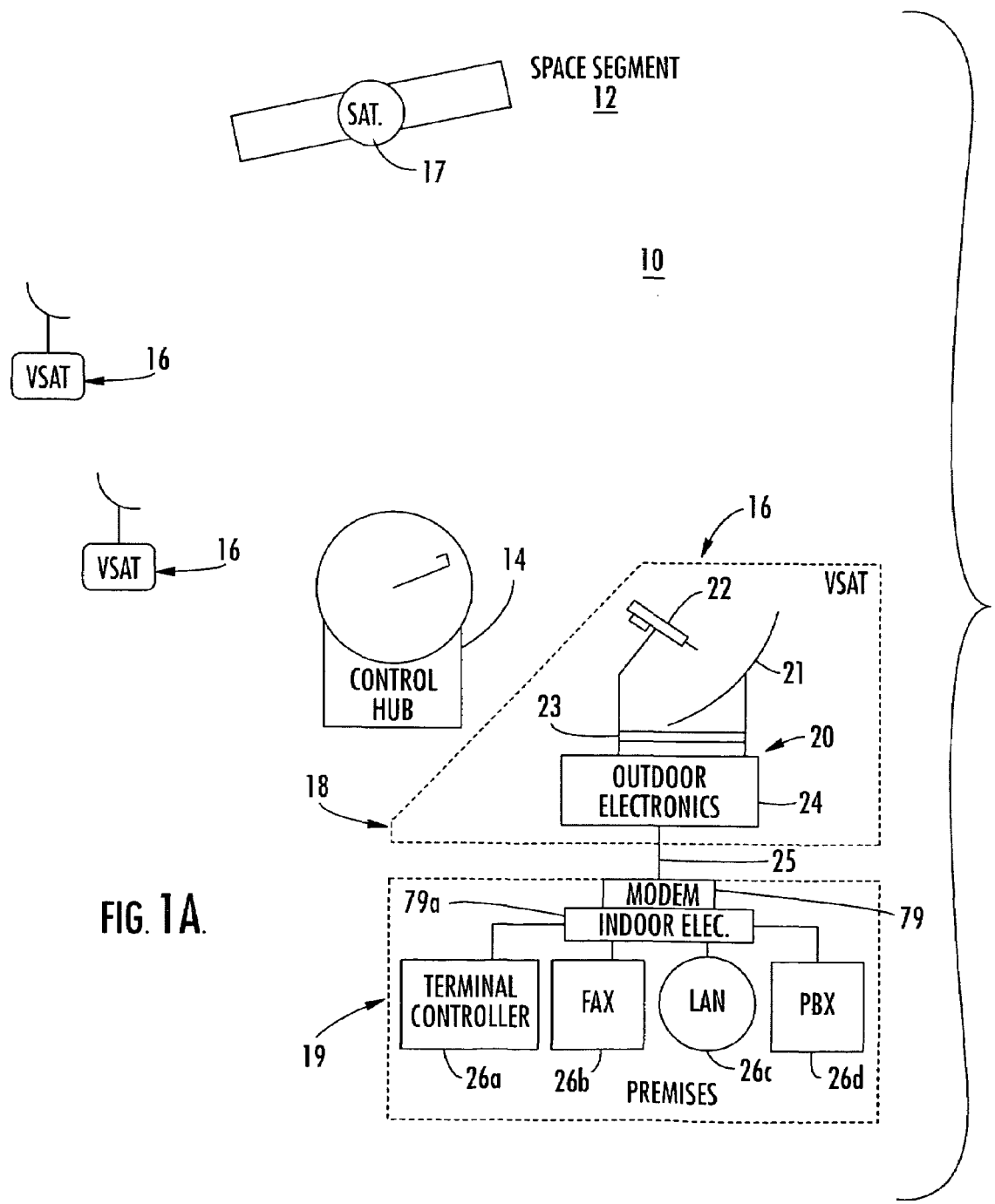
FIG. 1A is a fragmentary, block diagram showing basic network components used in a very small aperture terminal (VSAT) communications system.

FIG. 1A illustrates a block diagram of a very small aperture terminal (VSAT) network or communications system 10 showing basic elements of the space segment 12, a control hub also referred to as a master earth station 14, and a number of VSAT remote earth stations 16 also referred to individually as VSATs or VSAT terminals. The space segment 12 includes a number of satellites 17 (only one shown but typically at least three) used for satellite communication and typically positioned in a geostationary orbit about 36,000 kilometers above the equator. The central hub 14 (master earth station) acts as a central communications and monitoring terminal and usually includes a large, 6-meter (about 18 feet or larger) diameter antenna, associated communications electronics, and a self-contained, back-up power system. The central hub 14 is usually manned and operated 24 hours a day, 7 days a week. The central hub 14 acts as a monitoring and communications center and sends signals directly to remotely positioned VSAT terminals 16 and monitors and controls all communications within the VSAT network. The central hub 14 controls, monitors and communicates with each of the VSAT terminals 16 that are disbursed throughout a very large geographic area.

Each VSAT terminal 16 includes an outdoor unit 18 and an indoor unit 19. The outdoor unit 18 includes a dish antenna unit 20 of about 1.0 to about 3.0 meters diameter, varying in size as depending on its geographic location, the type of received signals, and difficulty in amplifying a signal based on the dimensioned antenna dish. The dish antenna unit includes a reflector 21, feed horn 22 and a mount 23, such as a frame, as known to those skilled in the art. The feed horn 22 is usually mounted at the focal point of the antenna reflector 21 and directs transmitted power towards the antenna reflector 21 or collects any received power.

As illustrated, the outdoor unit 18 includes outdoor electronics 24, which include low noise amplifiers (LNA) and down converters for down converting received signals, and up converters for up converting signals for transmission to satellites. The low noise amplifiers (LNA) typically minimize noise added to the signal during the first stage of conversion. Other associated circuits that form outdoor electronics 24 include a transmitter circuit. In the present invention, the up/down converters would convert frequencies between an intermediate frequency, usually an intermediate frequency level of about 1 GHz, and a radio frequency.

Usually the outdoor unit 18 is connected by a low loss, co-axial cable 25 to the indoor unit 19. This coaxial cable 25 usually is limited to about 300 feet in length. The indoor unit 19 typically includes various modulators that superimpose a user traffic signal on a carrier signal, which is then sent to the outdoor electronics 24 for up-conversion, amplification and transmission to the satellite 17. Demodulators receive the signal from the outdoor electronics 24 in the intermediate frequency range and demodulate the signals to segregate the user traffic signal from the carrier.

As illustrated, the indoor unit 19 interfaces with premises equipment, including various systems such as a terminal controller 26a, fax machine 26b, local area network (LAN) 26c, private branch exchange 26d, and other premises equipment or devices known to those skilled in the art. These are only non-limiting examples of the type of devices that interface with the indoor unit 19.

Figure 1B:
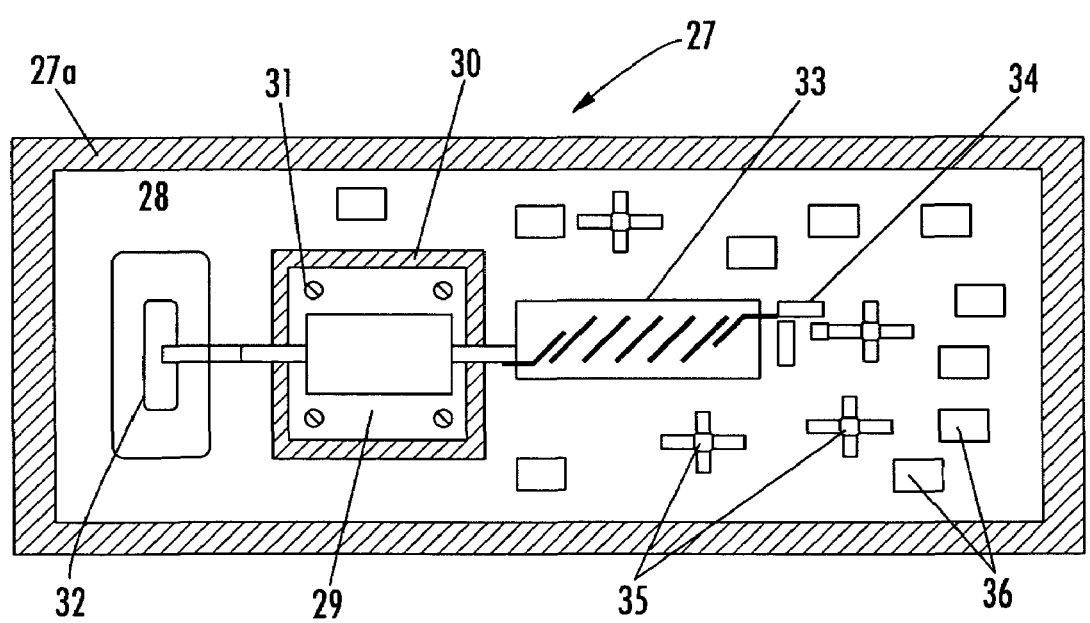
FIG. 1B is a fragmentary, layout diagram of a current, state-of-the-art, Ka-band VSAT transceiver.

FIG. 1B shows a typical layout diagram of a prior art Ka-band VSAT transceiver 27 that uses packaged MMIC chips, discrete components, and soft board for all RF circuits. As illustrated, a housing 27 has mounted therein a soft board substrate 28, such as formed from Rogers board or similar board material. This soft board has surface mounted low frequency components, including at least one packaged high power MMIC amplifier chip 29 that is typically positioned to fit within a board cut-out 30 and secured by mounting screws 31. The MMIC chip 29 is operatively connected to a waveguide transition 32 and an etched filter 33 and tuning stub 34. Discrete devices 35 and other surface mount technology parts 36 are positioned on the soft board in a manner as known to those skilled in the art. Rogers board and other soft boards can be formed from glass microfiber reinforced PTFE composites and similar materials.

Any packaged dies, especially any high power MMIC amplifier chips 29, can be attached directly to the housing 27 using screws. The soft board 28 is cut to allow direct attachment of any high power MMIC amplifier chips 29. The filters 33 are typically etched on the top surface of the soft board. The filters usually require tuning after assembly because of the inherent variation in the manufacturing of soft board. These transceivers usually provide a nominal transmit and receive gain that varies by many decibels (dB) over temperature. They also provide a fixed transmitter output power that is not adjustable based on the weather conditions.

Figure 2:
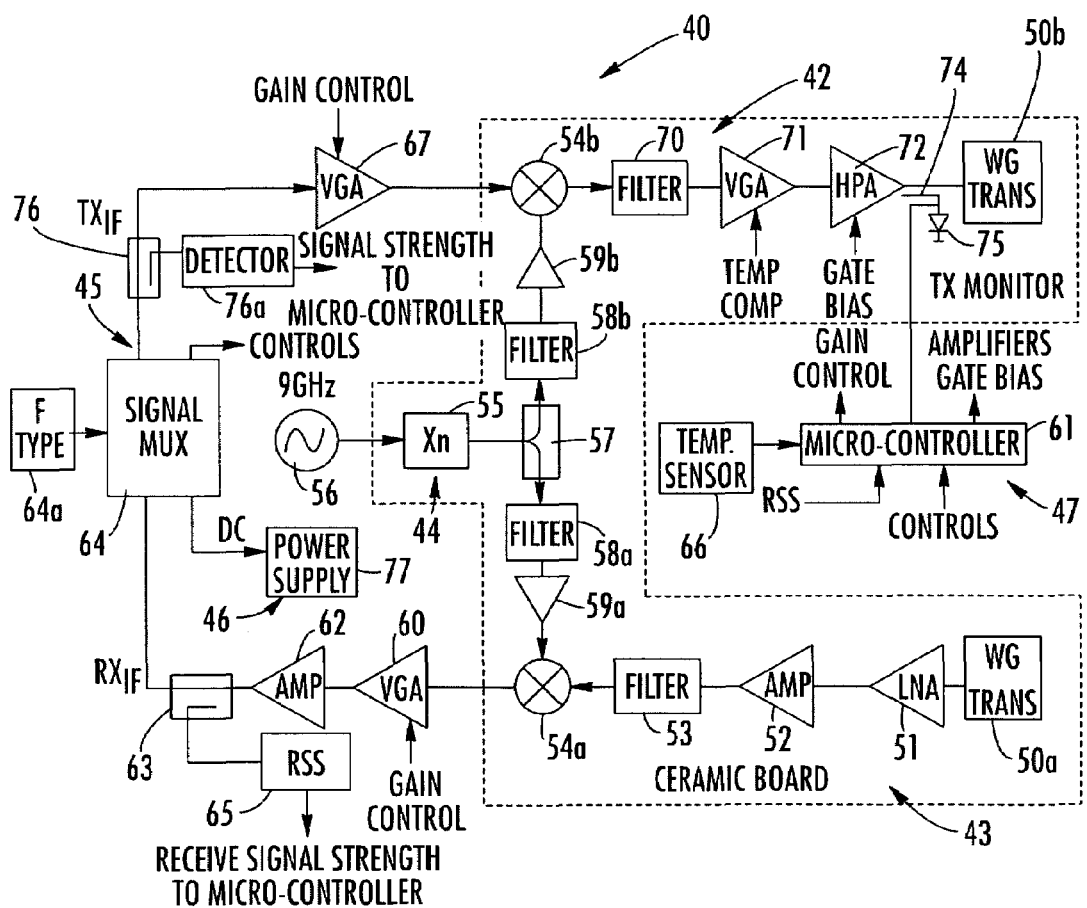
FIG. 2 is a block diagram of an improved millimeter wave VSAT transceiver as disclosed.

FIG. 2 illustrates a block diagram of the "smart" VSAT transceiver 40 that provides for enhanced circuit function using a microcontrolled operation. The VSAT transceiver 40 includes basic circuit units of a transmitter circuit 42 operating at Ka-band, a receiver circuit 43 operating at K or Ka-band, an X-band local oscillator (LO) multiplier circuit 44, a signal multiplexer circuit 45, a power supply circuit 46 and a microcontroller circuit 47.

The receiver circuit 43 and transmitter circuit 42 are positioned on a ceramic substrate board, such as formed from ceramic material, such as 95% or 96% alumina, and operable at the intermediate frequencies $X_{IF}$ that are forwarded and received to the indoor unit. Amplifiers as described below are typically formed as microwave monolithic integrated circuit (MMIC) chips. The receiver circuit 43 includes a receiver waveguide transition 50a that receives the Ka-band signals. This transition 50a is operatively connected to MMIC amplifier chips such as a low noise amplifier 51 and a second amplifier 52.

Signals that are amplified are passed through a filter 53 and into a mixer 54a that receives a local oscillator signal from the X-band local oscillator multiplier circuit 44, which includes on the ceramic substrate board a multiplier circuit 55 that receives a 9 or 10 GHz signal from an oscillator 56. This signal is split after passing from the multiplier circuit 44 by a signal splitter 57 into two signal paths that pass to respective transmitter and receiver circuits 42, 43. The split signals pass through respective filters 58a, 58b and amplifiers 59a, 59b into the respective mixers 54a, 56b of respective receiver and transmitter circuits 42, 43. The received signal from the satellite is amplified by the low noise amplifier 51, 52, filtered by filter 53, and down converted in mixer 54a with the local oscillator signal and amplified by the variable gain amplifier 60.

A gain control signal from the microcontroller 61 controls gain. The signal from variable gain amplifier 60 passes into a second amplifier 62 and into a splitter/coupler 63 after amplification. Part of the signal is coupled into a signal multiplexer 64 and the other part of the signal is coupled into a received signal strength circuit 65 that determines signal strength and generates RSS signals to the microcontroller 61 indicative of the received signal strength. Inputs are also received into the microcontroller 61 from at least a temperature sensor 66, and from user input or predefined standard control signals. The microcontroller 61 outputs a gain control signal and an amplifier gate bias signal. The gain control signal is forwarded as a control signal to the variable gain amplifier 60 of the receiver circuit. The amplifier gate bias signal is forwarded to the transmitter circuit. These signals from the microcontroller control transmitter gain and output power as will be explained in greater detail below.

The split local oscillator signal also passes to the transmitter circuit 42 via a filter 58b and amplifier 59b into the transmitter circuit mixer 54b. In the transmitter circuit, signals originating from the indoor unit pass through the F-type connector 64a to the multiplexer 55 and then through a splitter/coupler 66 into a variable gain amplifier 67 to transmitter circuit mixer 54b. The variable gain amplifier also receives the gain control signal from the microcontroller. From the mixer 54b, the signal passes through a filter 70 and into a variable gain amplifier 71, which receives a temperature compensation signal from the microcontroller. The signal passes to a high powered amplifier 72, which receives the amplifier gate bias signal from the microcontroller, and through a waveguide transition 50b for radio frequency transmission and satellite communications. The microcontroller is operatively connected to a transmitter power monitoring circuit that receives a split signal into a diode 75. A splitter/coupler 74 is in line with the high powered amplifier and waveguide transition as illustrated.

Other signals along the transmitter circuit are passed from a splitter/coupler 76 into a signal strength detector circuit 76a that generates a signal strength signal to the microcontroller. Other signals from the signal multiplexer pass to a DC power supply circuit 77 and as control signals such as for various amplifiers, including MMIC chip circuits. The temperature sensor 66 generates a temperature signal to the microcontroller indicative of the temperature of the transceiver.

The transmitter intermediate frequency (IF) signal from the modem 79 in the indoor unit (IDU) 19 is converted to Ka-band and amplified using the various MMIC amplifiers. The receiver radio frequency (RF) signal is down-converted to IF and amplified prior to sending it to the indoor unit 19. The local oscillator (LO) signal is generated by multiplying the output of the oscillator 56 as an X-band (9 to 10 GHz) low cost dielectric resonator oscillator (DRO) (free running or phase locked) or a multiplied-up VCO. The indoor unit 19 and the MMIC transceiver 40 are connected via a single coax cable. The multiplexer 64 separates the transmitter IF signal, the receiver IF signal, the DC signal and the control and command signals (tones), which are all frequency multiplexed on the same coaxial able. The power supply 77 converts high voltage DC signals (>24 VDC) to the desired lower level DC signals needed to run the amplifiers and the control circuits.

The microcontroller 61 is formed as a microprocessor that is surface mounted on a separate "soft" or controller board, as will be explained below, and provides all the control and monitoring functions and interfaces with the indoor unit 19. The microcontroller 61 also provides the logic intelligence "smarts" required to control the individual MMIC chips in the unit, such as using the circuit function described in commonly assigned U.S. patent application Ser. No. 09/863, 052, entitled "Self-Tuned Millimeter Wave RF Transceiver Module," the disclosure which is hereby incorporated by reference in its entirety.

Figure 3:
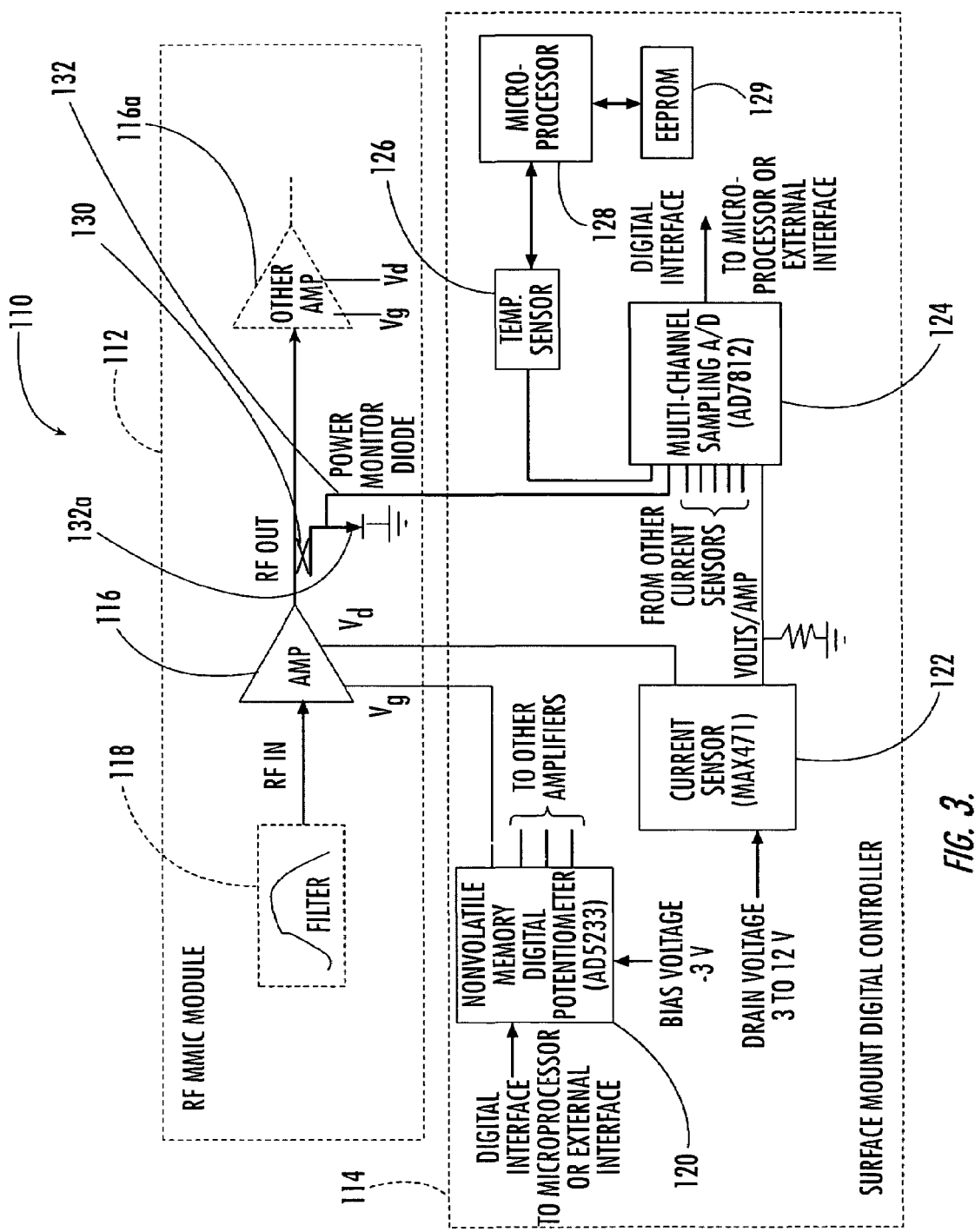
FIG. 3 is a schematic circuit diagram of an example of a self-tuned, millimeter wave transceiver microcontroller circuit that could be modified for use with the VSAT transceiver of FIG. 2, and provide an enhanced circuit function.

One non-limiting example of a microcontroller circuit that can be modified for controlling MMIC chips and self-biasing is described below with reference to FIG. 3. Naturally, other circuits could be designed. The circuit operation described below with reference to FIG. 3 gives only one example of the type of microcontroller circuit that can be used and the function that can be accomplished. FIG. 3 illustrates an example of a low cost circuit that can be used and is explained for purposes of describing the microcontroller function that can be used. The entire circuit can be implemented using low cost commercial off-the-shelf (COTS) surface mount chips.

A self-tuned millimeter wave transceiver module 110 is shown. The module 110 includes a radio frequency MMIC chip formed as a module and illustrated by the dashed lines at 112 and a surface mounted digital microcontroller, indicated by the dashed lines at 114.

The MMIC module includes a plurality of amplifiers, as is typical with a MMIC chip, but only illustrates one amplifier 116 for purposes of description. The radio frequency signal enters and passes through a filter 118 and into the amplifier 118 having the normal gate, source and drain. The radio frequency signal passes from the amplifier 116 into other amplifiers 116a (if present). The MMIC chip 112 can include a large number of amplifiers 116 on one chip. The surface mounted digital controller 114 includes a digital potentiometer 120 having a nonvolatile memory circuit. An example of a potentiometer includes a AD5233 circuit. The potentiometer 120 can handle a bias voltage of about −3 volts.

A current sensor 122, such as a MAX471 with a drain voltage of 3–12 volts, is coupled to ground and to the amplifier 116 through the drain. The current sensor 122 is connected to a multi-channel sampling, analog/digital circuit 124, such as an AD7812 circuit. Other current sensors connect to other amplifiers (not shown) and connect to the multi-channel A/D circuit 124. A temperature sensor 126 is connected to the multi-channel sampling A/D circuit and is operative for measuring the temperature of the MMIC module. A microprocessor 128 is included as part of the surface mounted digital controller, and operatively connected to an EEPROM 129 and other components, including the multi-channel sampling A/D circuit 124 and the nonvolatile memory digital potentiometer 120. As shown, the potentiometer 120 is connected to other amplifiers on the MMIC and can step gate voltage for respective amplifiers and provide individual control.

As also illustrated, the radio frequency signal from the amplifier 116 can pass from the passive coupler 130 to a power monitor diode or other detector circuit 132 connected to ground. This connection from the passive coupler 130 can be forwarded to the multichannel sampling A/D circuit 124.

The circuit adjusts automatically the amplifier gate voltage (Vg) until the amplifier 116 reaches its optimum operating condition as measured by the amount of current drawn by the drain (Id), and as measured by the detector circuit 132 at the output of the amplifier (if available). This is achieved by controlling (through a serial digital interface) the Digital-to-analog (D/A) converter output voltage generated from potentiometer 120. The D/A converter includes a nonvolatile memory and is currently available with four channels for less than $3 at the current time.

As the gate voltage is varied, the current sensor 122 provides a voltage output that is proportional to the drain current drawn by the amplifier 116. The current sensor output is digitized by the multi-channel serial analog-to-digital converter (A/D) 124 that digitizes the drain current level. The current level word is compared to a pre-stored optimum amplifier drain current level, such as contained in the EEPROM 129. The gate bias level is adjusted until the optimum drain current is reached. The detector circuit, which is available either on the MMIC chip or could be added externally, provides a confirmation that the drain current setting is at the optimum level by measuring the output power. The detector output 132 is compared to a pre-stored value that defines the expected nominal value at the output of the amplifier.

The drain current adjustment, the current sensing and detector output measurements can be implemented in a real-time continuous adjustment mode by using low cost microprocessor or through a one-time setting that is accomplished during module test. The EEPROM 129 can be used to store preset chip characteristics, such as optimum drain current and expected output at various stages in the RF circuit.

The current measurement sensor 122 also allows for diagnostics of each amplifier in the circuit. The current measurement circuit will sense any unexpected drop or increase in current draw. By monitoring the temperature sensor 126, the microprocessor 128 determines whether a change in current (Id) is caused by a temperature change or malfunction. The status of each amplifier 116 is reported via the digital serial interface.

In cases where DC power dissipation is a prime concern because of thermal issues, any amplifiers 116 can be adjusted via the gate bias control such that the amplifiers draw minimal current. A user may select a maximum temperature, and the microprocessor will maintain the transceiver at or below that temperature by controlling the DC power dissipation in the MMIC chips.

Traditional methods of controlling gain and output power in RF modules has been to use active attenuators in the transmitter chain. This is inefficient because any amplifiers in the chain will dissipate power. By using the digital potentiometer 120, the gain and output power of each amplifier can be controlled individually or in groups. The module has infinite control over gain and output power, without adding active attenuators after each amplifier, thus, reducing cost and eliminating unnecessary DC power dissipation.

RF power sensing can be achieved through the power monitor diode and detector circuit 132 by coupling some of the amplifier output power (15 to 20 dB) into the passive coupler 130. The output of the coupler is sensed by a diode 132a. The output of the diode 132a is amplified and digitized via the serial A/D converter.

The digital potentiometer 120, current sensor 122 for each amplifier, and the temperature sensor 126 allows the module to self adjust its gain as a function of temperature changes. This is accomplished by maintaining the pre-set current draw from each amplifier constant as the module temperature changes. The module gain and output power can be controlled with high precision.

A user's ability to program the module gain at any stage in the circuit chain provides the flexibility to trade-off key performance parameters, such as transmitter noise figure (NF) versus intermodulation level (IM), without changing the circuit design. Real-time individual chip control also allows the user to operate in a desired condition, such as a linear mode for high modulation communications.

It should be understood that this described self-optimization technique can also be used on different devices with the MMIC chip, such as a mixer, multipliers, and an attenuator. By pinching off (maximum negative gate bias), all amplifiers in the transmit chain can be highly attenuated (over 50 dB) for safety reasons during installation. No additional switches or hardware are required.

The use of the microprocessor 128 and the chip control circuits as explained above allows the module manufacturer to enable only those features that a customer desires for a particular application, such as in the VSAT transceiver as described. Although the module hardware can be identical, the module features can be controlled by software. This allows flexibility of using the same module in many different applications, including wireless point-to-point, point to multi-point, or the VSAT as described. Additionally, the use of the microprocessor and a standard interfaces allows programmability and software upgrades (for additional features) of the modules in the field without removing them.

The use of a microcontroller 114 with the associated microprocessor 128 and onboard EEPROM 129 allow for correction and tuning of various functions within the module. In this specifically described function, the corrections may include, but are not limited to (a) gain variation over temperature, (b) linearization of the power monitor circuit as a function of temperature and frequency, (c) gain equalization as a function of frequency, and (d) power attenuation linearization as a function of frequency and temperature. The use of the microprocessor 128 to control each of the active devices with the RF module, and the use of the EEPROM 129 to store correction factors, allow a high degree of flexibility and enables the module to operate with high accuracy and performance. Module characterization data (gain, power, noise figure) are collected over temperature and frequency during module testing. The correction factors are calculated automatically by a Test Station and stored in the EEPROM 129. The correction factors are used during normal module operation to provide a desired performance.

The microcontroller in the present invention senses various operating conditions, such as, but not limited to temperature, transmitter output power, transmitter gain, and receive signal strength (RSS). Based on these signals and optional information sent from the indoor unit, the microcontroller autonomously and continuously adjusts the transceiver gain and output power to maintain the desired performance over all temperature and weather conditions.

Controlling the amount of VSAT transmitted power is important because it reduces the amount of interference and allows a high density of terminals to communicate with the same satellite.

There are two ways to control the amount of transmitted power. The first method uses the detected receive signal level, measured by the RSS circuit 65, to estimate the amount of atmospheric attenuation. The received signal could also be the satellite beacon signal. The microcontroller 61 will continuously monitor the received signal level. A decreasing received signal indicates increasing attenuation due to rain or cloud.

The amount of transmitter power is increased proportionally to the change in received signal. The reduction in transmitter power level is sensed using the power monitor diode 75 located at the output of the transmitter circuit 42 before the waveguide transition 50b and operatively connected to the passive power output splitter/coupler 74. The power monitoring circuit is implemented by coupling some of the amplifier output (−15 to −20 dB) into the passive power output splitter/coupler. The output of this coupler is sensed by the diode 75. The output of the diode 75 is amplified and digitized via the A/D, which resides inside the microcontroller 61.

The second method of adjusting transmitter power is to use the signal-to-noise (Eb/N) information received from the modem 79, which is part of the indoor electronics 79a of the indoor unit 19. Most indoor units monitor the (Eb/N) ratio. The measured level is then transmitted to the outdoor unit 18 via the control interface of the system as part of the indoor electronics 79a. The microcontroller 61 of the outdoor unit 18 will then set the transmitter power based on the received value from the indoor unit.

Controlling the amount of transmitted power also has the added benefit of reducing the amount of heat generated in the overall unit and thereby improving reliability. The microcontroller has the ability to throttle back the amplifiers by adjusting their gate bias in such a way that they only draw as much current as required to generate the minimum required gain and output power generally by using the system and method as described above. Using this system and method, it is expected that the transceiver will generate at least 50% less heat and therefore double the expected reliability of the unit.

Figure 4A:
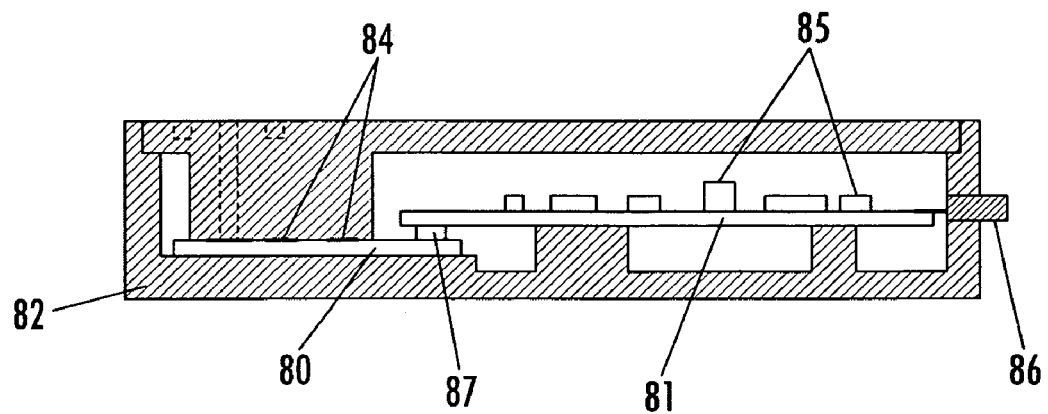
FIGS. 4A and 4B are respective cross-section and top plan views of an example of the circuit packaging that can be used for the VSAT transceiver, shown in FIG. 3.
Figure 4B:
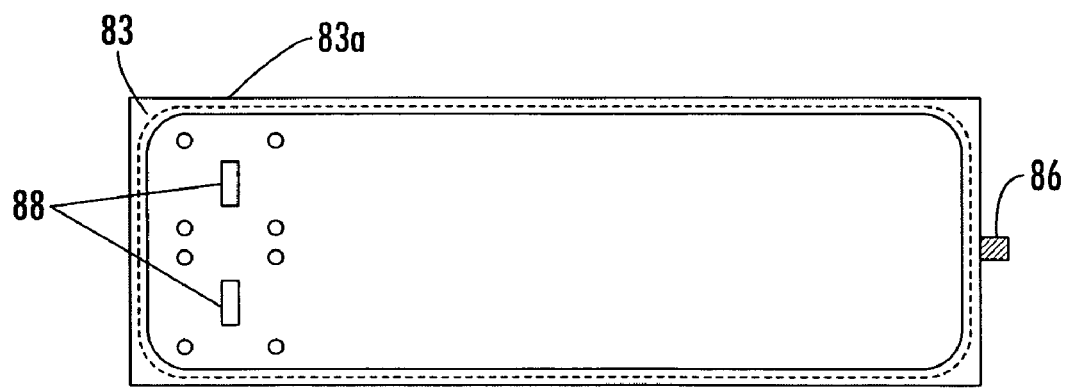

A sectional and top plan view of the MMIC transceiver 40 construction is shown in FIGS. 4A and 4B. The transceiver is constructed preferably from three major sub-assemblies: 1) a ceramic board 80 for all MMW RF circuits, 2) a controller or soft board 81 for mounting the microcontroller and all DC and low frequency signals, and 3) an aluminum housing 82 and cover 83. The MMIC chips 84 are attached directly to the ceramic board 80, as shown in FIG. 4a, and by techniques such as described in commonly assigned U.S. patent application Ser. No. 10/091,382, entitled "Millimeter Wave (MMW) Radio Frequency Transceiver Module and Method of Forming Same," the disclosure which is hereby incorporated by reference in its entirety.

The controller or soft board 81 may include various surface mounted components and related circuit components 85 and is operatively connected to a coaxial connector 86 and uses a contact connector 87 as will be described below to connect various circuits on the soft board 81 with the ceramic board 80. The cover 83 includes transmit and receive waveguide ports 88 that may operatively connect to the various MMIC chips using various circuit connection structures and techniques.

The '382 application discloses an improvement over prior art "chip and wire" fabrication techniques that can be used with the present invention. A millimeter wave (MMW) radio frequency transceiver module includes a substrate board. A plurality of microwave monolithic integrated circuit (MMIC) chips are supported by the substrate board and, in one aspect, are arranged in a receiver section, a local oscillator section, and a transmitter section. A plurality of filters and radio frequency interconnects are formed on the substrate board and operative with and/or connect the receiver, local oscillator and transmitter sections. A plurality of electrical interconnects are operative with and/or connect the receiver, local oscillator and transmitter sections.

FIGS. 5–8 illustrate non-limiting examples of the type of circuit and board structure and interconnection among functional circuit components, including MMIC chips, which could be used in the present invention. Naturally, other circuit structures and designs could be used.

Figure 5:
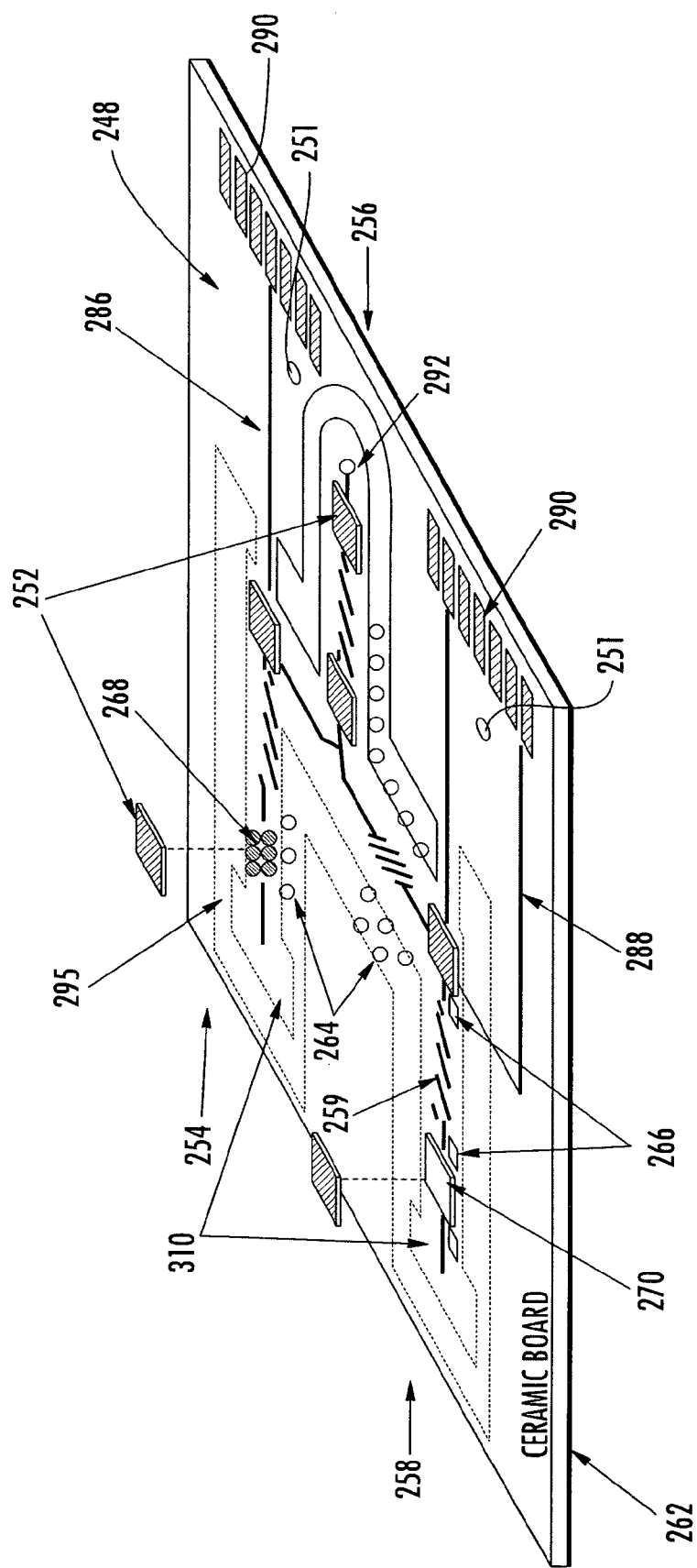
FIG. 5 is a fragmentary, generally isometric view of an example of a substrate board and components that can be used in the present invention and showing the Ka-band high frequency microwave monolithic integrated circuit (MMIC) chips, filters, low cost surface mount components, and the interconnection among these various components.
Figure 6:
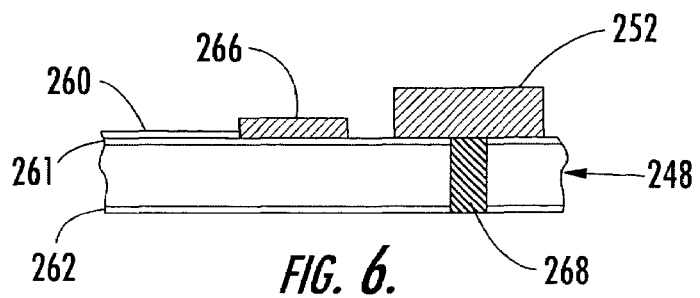
FIG. 6 is a fragmentary, sectional view of an example of a single layer, substrate board that could be used with the present invention and showing RF circuitry, and an adhesion and RF ground layer.

As illustrated in FIG. 5, a plurality of microwave monolithic integrated circuit (MMIC) chips 252 are supported by the substrate board 248 formed preferably as a ceramic board, e.g., an alumina board, and arranged in a receiver circuit 254, a local oscillator circuit 256 and a transmitter circuit 258. A plurality of filters 259 and radio frequency interconnects are formed on the substrate board and operative with and/or connect the receiver, local oscillator and transmitter circuits 254, 256, 258. Any filters 259 and radio frequency interconnects 260 (FIG. 6) are preferably formed by thick film processing techniques, such as low temperature co-fired ceramic techniques, using methods known to those skilled in the art and are part of a top circuitry 261 (FIG. 6). A plurality of electrical interconnects are operative with and/or connect the receiver, local oscillator and transmitter circuits 254, 256, 258. The electrical interconnects are printed on the substrate board as part of circuitry 261 (FIG. 6) using printing techniques (including thick film techniques if desired) as known to those skilled in the art.

This embodiment is shown in FIG. 5 with a single ceramic substrate board 248, and its top layer having the MMIC chip and RF interconnects (circuitry) 260 printed by thick film processing and/or other techniques thereon (FIG. 6). The bottom layer includes a radio frequency and ground layer 262 formed on the other side of the ceramic substrate board. The electrical interconnects (circuitry) associated with the RF interconnects (circuitry) and are typically printed on top as shown by the circuitry 261 in FIG. 6.

In another aspect of the present invention, at least one row of ground vias 264 are formed within the substrate board and provide isolation between at least the transmitter and receiver circuits 254, 258 formed on the substrate board. The vias 264 extend from the top portion of the substrate board through the substrate board to the radio frequency and ground layer 262. Ground vias 264 provide high isolation of greater than seventy (70) decibels between the transmitter and receiver chains in the transceiver modules. The vias 264 are typically spaced about a quarter of a wavelength apart and the via density can be adjusted based on isolation requirements. In areas where lower isolation is tolerated, a single row of ground vias 264 could be spaced approximately 0.4 wavelengths apart. In those areas where higher isolation is required, a second, offset row of vias could be used.

In another aspect of the present invention, the single, ceramic substrate board 248 can be formed from about 90% to about 100% alumina, and in one preferred embodiment, is about 95% or 96% to about 99% alumina. The board 248 can have different thicknesses ranging from about 5 to about 20 mil thick, and preferably about 10–15 mil thick.

As shown in FIG. 5, high frequency capacitors 266 can be embedded on the top surface of the ceramic substrate board. The embedded capacitors eliminate the requirement for conventional and high cost, metal plate capacitors used with high frequency MMIC chips. It is possible to add a resistance material to the capacitor dielectric material and optimize the capacitor resonant frequency. Surface mount (SMT) capacitors can also be adhered by epoxy to the top surface of the ceramic substrate board for applications where the embedded capacitor values are insufficient to prevent oscillations.

It is also possible to form thermal heat sink (or possibly RF) vias 268 that are filled with conductive material under the MMIC chips to achieve adequate electrical performance and improved thermal conductivity as shown in FIGS. 5 and 6. These vias 268 extend from the MMIC chip to the radio frequency and adhesion ground layer 262. If the MMIC chip is still generating excessive heat, a cut-out 270, such as formed from laser cutters, can be made within the ceramic substrate board to allow direct attachment of the MMIC chip to a coefficient of thermal expansion matched carrier or heat sink, which could be part of the bottom plate.

Figure 7:
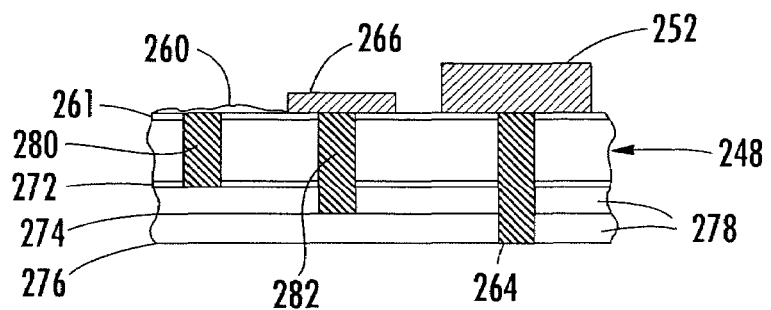
FIG. 7 is a fragmentary, sectional view of a substrate board that can be used with the present invention, which includes dielectric layers and conductive layers positioned on the substrate board.

FIG. 7 illustrates an embodiment where the ceramic substrate board 248 includes a radio frequency ground layer 272. A DC circuitry layer 274 and an adhesion ground layer 276 are separated from the ceramic substrate board by two dielectric layers 278, as illustrated. A radio frequency via 280 is operatively connected from the radio frequency circuitry 261 to the radio frequency ground layer 272. A DC via 282 is operatively connected from an embedded capacitor 266 on the top surface of the substrate board to the DC circuitry layer 274. A thermal via 268 is operatively connected from the MMIC chip 252 through the ceramic substrate board 248 and the two dielectric layers 278 to the adhesion ground layer 276.

FIG. 5 also illustrates a 50 ohm microstrip line 286 as formed as part of the RF circuit 261 and a DC signal trace line 288 formed as an electrical interconnect (circuit). The transmitter and receiver sections 254, 258 include a DC and intermediate frequency connection pad 290 that is operatively connected by a 50 ohm microstrip lines and DC signal trace to various MMIC chips as part of the receiver and transmitter circuits.

The housing cover 83, such as shown in FIG. 4B, could include an electromagnetic interference gasket 83a (shown by dotted line) that is positioned on top of the ceramic substrate board and around the MMIC chips supported by the ceramic substrate board when the housing cover is mounted on top of the housing shown in FIG. 4A. The ceramic substrate board 248 could also include an electromagnetic interference ground contact strip 295 that surrounds the transmitter, receiver and local oscillator circuits 258, 254, 256 and engages the interference gasket when the housing cover is secured to the bottom plate 244.

As illustrated in FIG. 5, the transmitter, receiver and local oscillator circuits 258, 254, 256 are formed substantially separated from each other to enhance isolation and reduce oscillations. The housing cover could includes an inside surface portion that includes formed radio frequency channels. An electromagnetic interference gasket 83a could be contained around the radio frequency channels, such that when the housing cover is applied on the housing, the gasket is received and mounted around the receiver, transmitter and local oscillator circuits. It is also possible to include a radio frequency channel/echo absorbent material that is mounted within the cover to aid in improving isolation and reducing possible isolations.

The radio frequency module layout could be channelized in sections to provide high isolation and prevent possible oscillations. Channel neck-down can be used in key areas to improve isolation. As shown in FIG. 5, the transmitter, receiver and local oscillator circuits 258, 254, 256 are formed relatively straight and narrow, as described before, and are positioned substantially separated from each other. This is especially applicable in high gain amplifier cascade applications.

Intermediate frequency, radio frequency and DC connections can transfer signals to and from the ceramic substrate board. The DC and intermediate frequency signals can be transferred in and out of the ceramic substrate board using pressure contact connectors, such as high frequency self-adjusted subminiature coaxial connectors (SMA) shown in FIGS. 9–13 of commonly assigned U.S. patent application Ser. No. 10/200,517, filed Jul. 22, 2002, the disclosure which is hereby incorporated by reference in its entirety.

Figure 8:
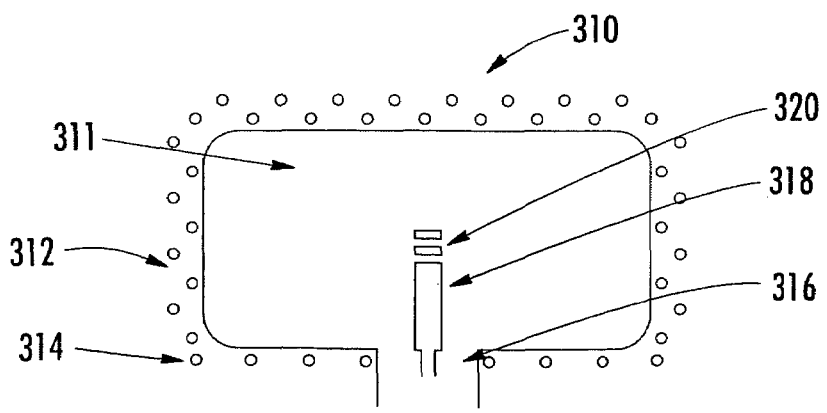
FIG. 8 is a fragmentary, plan view of a microstrip-to-waveguide transition that can be used in the present invention.
Figure 9:
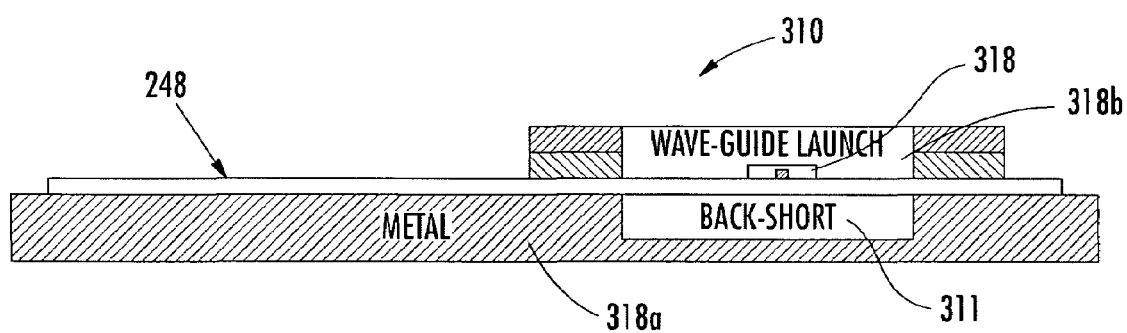
FIG. 9 is another fragmentary, plan view of a microstrip-to-waveguide transition that can be used in the present invention.

Radio frequency signals can be transferred in and out of signal traces, such as microstrip, on the ceramic substrate board using a broadband, low loss, microstrip-to-waveguide transition 310 (FIG. 8) that could correspond to waveguide transitions 50a, 50b of FIG. 5, where no cuts in the ceramic substrate board are required to implement the transition. As shown in FIGS. 8 and 9, the transition 310 includes a channel or backshort 311 with a channel wall ground layer 312 formed thereon and ground vias 314. A reduced channel width feed 316 is operative with a microstrip probe section 318 and a tuning section 320 illustrated as a pair of elements.

FIG. 9 illustrates a fragmentary sectional view of the transition 310 and shows the ceramic substrate board 248 having a backshort 311, including a formed metal section 318a and a waveguide launch 318b as part of the probe section 318. Built-up sections such as formed from thick film processing techniques could be used for the structure. In one aspect of the present invention, the depth of the backshort can be a function of many things, including the dielectric constant of any material used for the substrate board and a function of the bandwidth that the system achieves. The backshort could typically be in the range of about 25 to 60 mils deep. The isolation vias, as illustrated, aid in the transition. The backshort can be formed on either side of the substrate board to facilitate assembly and reducing overall costs. If energy is to be propagated up into a waveguide, then the backshort would be placed on the bottom portion of the ceramic substrate board. Other components, as illustrated, could include a regulator controller board, DC connector and other component parts as necessary.

Figure 10:
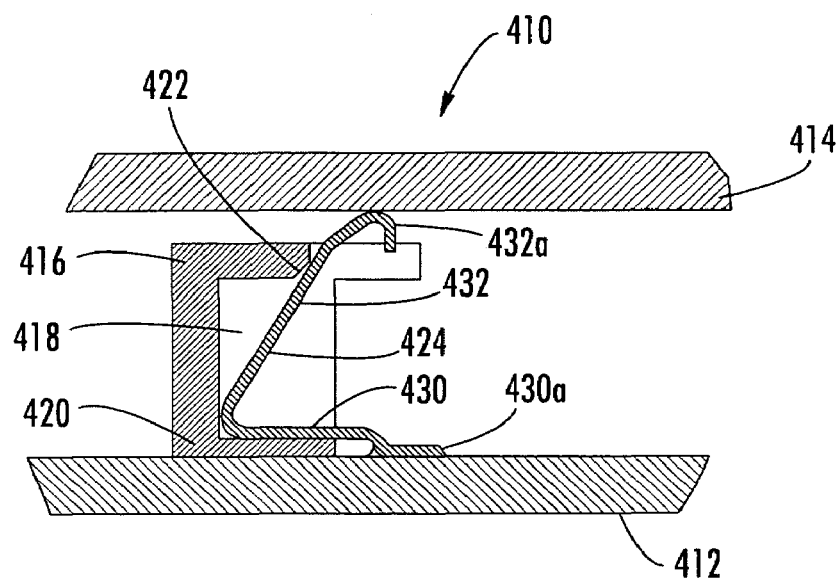
FIG. 10 is a fragmentary, sectional view of a surface mounted, pressure contact connector that can be used in the present invention and showing a connection between boards, such as a ceramic and controller or soft board used in the present invention.
Figure 11:
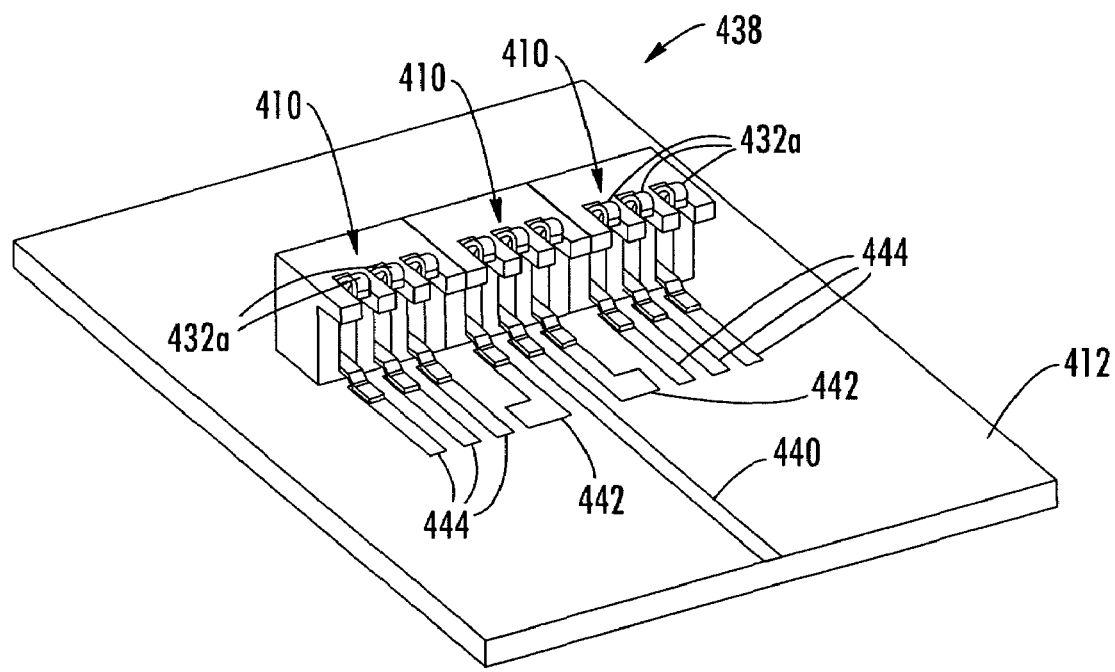
FIG. 11 is an isometric view illustrating a number of connectors such as that shown in FIG. 10 and positioned adjacent to each other on a first printed circuit board for forming a connection system where high frequency radio frequency signals, ground and DC signals can be transferred between overlying, cooperating boards such as a ceramic circuit board and a controller or soft board.

In the present invention shown in FIGS. 4A, 4B and 5, remaining low frequency components are assembled on the controller or soft board 81 using traditional surface mount methods. A controller or soft board 81, such as a Rogers board, could be used. An example of the controller or soft board is a board formed form a PTFE composite and having surface mounted DC and low frequency discrete devices. The solderless contact connector 87 is positioned between the ceramic board 80 and the low frequency, controller or soft board 81. An example of the type of connector 87 is shown in FIGS. 10 and 11 and described in commonly assigned U.S. patent application Ser. No. 10/224,622, the disclosure which is hereby incorporated by reference in its entirety.

FIG. 10 illustrates a portion of a surface mount, pressure contact connector 410 that would allow solderless connection between ceramic board and controller or soft board.

As shown in the fragmentary, partial sectional view of FIG. 10, the connector 410 can connect boards 412, 414, which could be respective ceramic and controller or soft boards, and connect circuits such as the microcontroller on the controller board and the MMIC chips on the substrate board. The connector 410 includes a housing member 416 having a clip receiving slot 418 (also referred to as a pin receiving slot) and a circuit board engaging surface 420 that is positioned against the ceramic substrate board 412. In one aspect of the present invention, each housing member 416 includes three clip receiving slots 418 as illustrated in FIG. 11, where three housing members 416 are shown adjacent to each other. The housing member 416 is preferably formed from plastic and is substantially rectangular configured and includes a substantially flat, circuit board engaging surface that rests prone against the flat surface of the board. Each clip receiving slot 418 is formed as a rectangular cut-out and includes a shoulder 422 for engaging the electrically conductive clip members 424 as shown in FIG. 10.

Each clip member 424 is substantially v-shaped as shown in FIG. 10. The clip members 424 are small and can also be referred to as pins because of their small, spring-like and pin-like capacity to make "pin" connections. Each clip member 424 includes a first leg member 430 and end that engages the board 412. This end includes a drop down shoulder 430a that is soldered to a circuit trace or other circuit on the board 412. The upper portion of the first leg member 430 is received within the clip receiving slot 418. A second leg member 432 has an end that is spring biased against the board 414. The second leg member 432 includes a bent contact end 432a that forms what could be referred to as a "pin" or spring contact for engaging in a biased condition a circuit or trace on the board. The leg member 432 engages the shoulder 422 in the clip receiving slot to maintain a biasing force or "spring-action" of the clip member against the shoulder, while also maintaining a biasing force against the board 414 such that the pressure contact established by the bent end of the second leg member engages the circuit, trace or other connection point on the board 414. The boards can have metallized pads that align with the connector "pins" formed by the clip member 424.

In one aspect of the invention where a number of connectors 410 form a connection system 438 as shown in FIG. 2, a central clip member interconnects a radio frequency signal line 440 such as the common 50 ohm impedance radio frequency signal line, known to those skilled in the art. Adjacent clip members 424 (or pins) interconnect ground lines 442 positioned on the opposing side of the radio frequency signal line 440. Although only one ground pin per side shown, the number of ground pins can be varied to increase isolation and improve return loss. Other adjacent clip members 424 (pins) connect DC and signal lines 444. Thus, the connector system 438 using the connectors 410 can transfer not only high frequency signals, but also ground connections and DC signals from one board 412 to the other board 414 via the clip members forming the spring-like pin connections.

In one aspect of the present invention, the spacing between the clip members (or pins) is about 40 mils and DC signals could be carried on other clip members in the same connector.

It is possible that different frequency and time division multiplexing access schemes can include demand assigned multiple access system where available channels are assigned for completing a call and channel the return to the pool for an assignment to another call. Point-to-point voice, fax and data requirements can be permitted and video conferencing supported. The central hub (FIG. 1) could allocate unique codes to each VSAT terminal and enable each VSAT terminal to transmit simultaneously and share common frequency bands. Different high bit rate code signals can be combined with data signals and any data/code signals mixed with locally generated and correctly synchronized code replicas.

Figure 13:
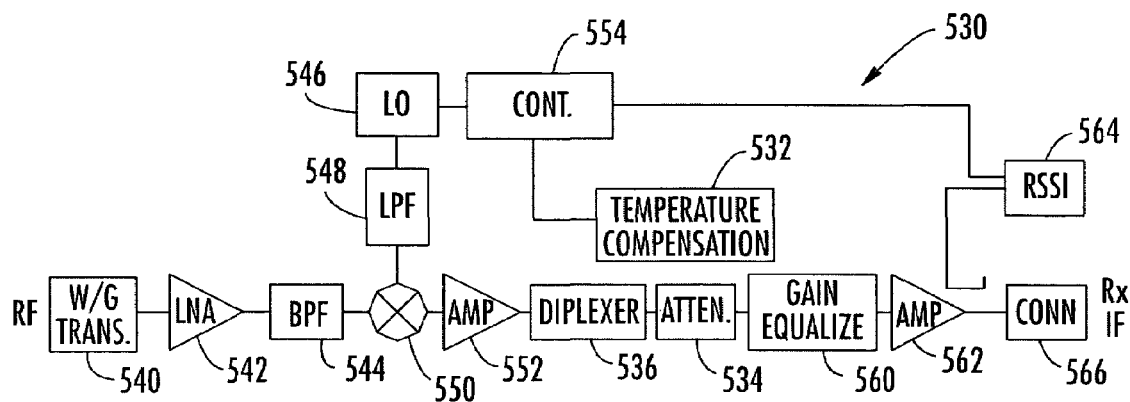
FIG. 13 is a block diagram of a compensated subharmonically driven microwave receiver that can be used in the present invention and applies for various applications, including VSAT.
Figure 14A:
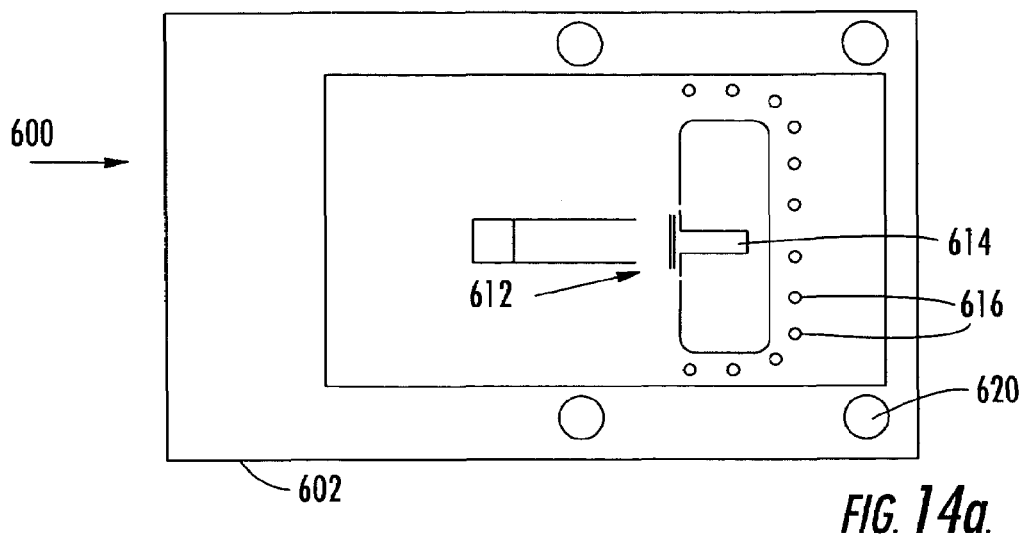
FIGS. 14A and 14B are respective top plan and side elevation views of a low loss waveguide launch that can be used in the low cost subharmonically driven microwave receiver shown in FIG. 13.
Figure 14B:
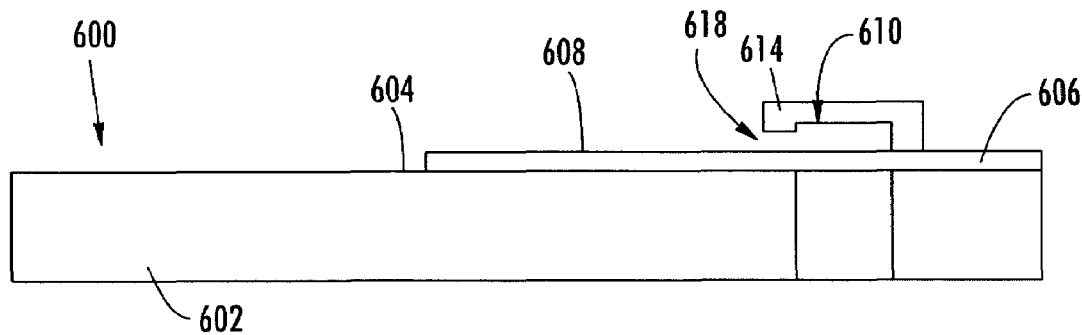
Figure 15:
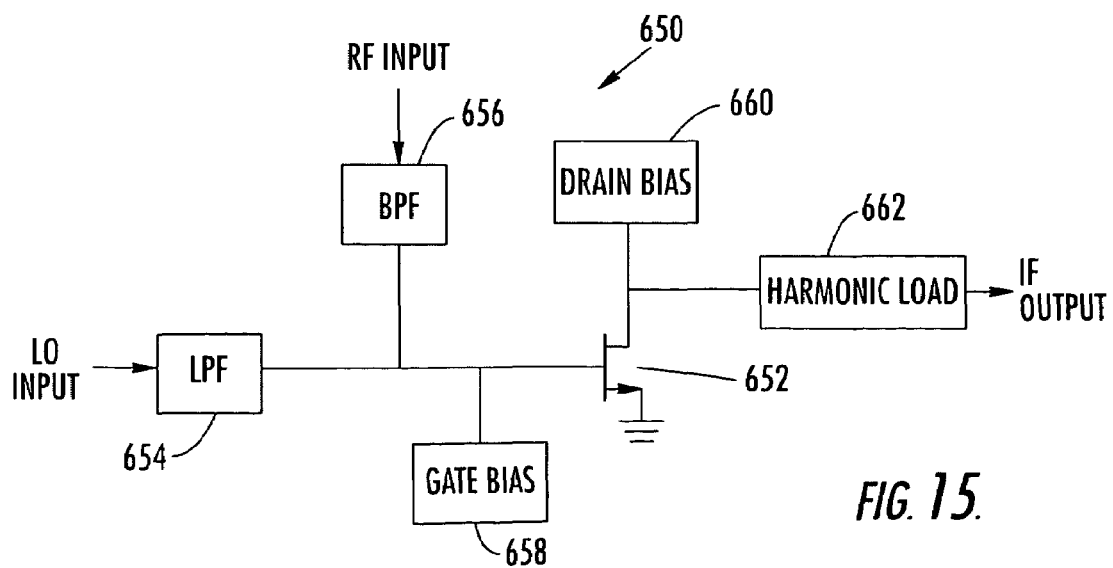
FIG. 15 is a block diagram of an active FET subharmonic mixer that can be used in the present invention shown in FIG. 13.

FIGS. 13–15 show an improved low cost subharmonically driven microwave receiver that could be used in a VSAT and other microwave devices such as those described above. This receiver is specially advantageous at microwave frequencies above 13 GHz and operable adequately at 20 GHz and higher.

Figure 12:
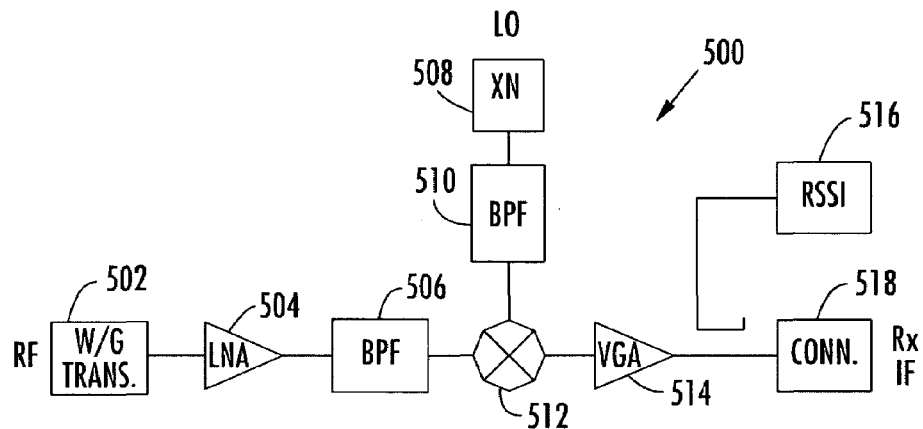
FIG. 12 is a block diagram of a prior art direct conversion receiver that is used at microwave frequencies.

A traditional prior art direct conversion microwave receiver 500 used for frequencies greater than 13 GHz is shown in FIG. 12. This type of system has required a die formed semiconductor to be placed on alumina or hard substrates. The microwave receivers using these traditional materials, such as the type of circuit shown in FIG. 12, have not been available at a cost acceptable to the commercial consumer market. The present invention provides a high linearity receiver that uses inexpensive surface mount parts in an innovative circuit configuration to achieve wide bandwidths at a low cost. The present invention also provides a unique circuit for subharmonically driven active field effect transistor (FET). The present invention can be used efficiently at 20 GHz (and above) with low noise using the inexpensive surface mount parts on a "soft" board as described above. Naturally, it is operable at higher frequencies for complete VSAT operation. The invention uses inexpensive surface mount parts and substrate materials such as described above to compensate for the degraded performance of packaged semiconductors at microwave frequencies. The compensation covers both broadband amplitude performance versus frequency and gain stabilization as a function of temperature. The receiver circuit of the present invention has a low loss waveguide transition to achieve a noise figure of about 2 decibels at 20 GHz and above. It has high signal linearity and isolation to support high order modulation.

FIG. 12 illustrates a block diagram for a traditional prior art direct conversion microwave receiver 500. As illustrated, the receiver 500 includes a waveguide transition 502 for RF frequencies and a low noise amplifier 504 followed by a bandpass filter 506. A local oscillator signal is generated by a signal generator 508 and passed through a bandpass filter 510 to a mixer 512 that receives the radio frequency signal from the bandpass filter 506. The "mixed" signal passes to a variable gain amplifier 514 and part of the signal is coupled into a receive signal strength indicator (RSSI) circuit 516 and converted into the receive intermediate frequency by CONN circuit 518.

FIG. 13 illustrates a block circuit diagram for the microwave receiver circuit 530 of the present invention, which uses innovative design and construction techniques of the present invention to achieve superior performance at low cost. The frequency and temperature compensation circuit 532 shown in the block diagram allows operation at intermediate frequency bandwidths exceeding 2 GHz in a temperature range exceeding 100° C. A correct placement of a temperature compensation attenuator 534, diplexer 536 and choice of components allows high signal linearity for use in a communication system using high order modulation.

As illustrated, the initial receiver end is similar to the circuit of FIG. 12, and the received signal passes into a waveguide transition 540 and low noise amplifier 542 followed by a bandpass filter 544, as described with the prior art circuit of FIG. 12. A local oscillator signal generated by circuit 546 passes through a low pass filter 548 into a mixer 550 which also receives a signal from the low pass filter 544. The mixed signal passes into an amplifier 552 and to the diplexer circuit 536. The temperature compensation circuit 532 can be controlled by a microcontroller 554. The mixed signal passes to the temperature compensation attenuator 534 and a gain equalizer circuit 560 and followed by amplification in an amplifier 562. Part of the amplified signal is coupled to a receive signal strength indicator (RSSI) circuit 564 and the greater portion of the signal passes through CONN circuit 566 as the receive intermediate frequency for subsequent processing. The controller 554 also can control the local oscillator circuit 546 and receive signals from RSSI circuit 564.

FIGS. 14A and 14B illustrate a low loss waveguide-to-microstrip transition 600 that can be used in the present invention. The transition 600 uses inexpensive substrate materials and a simple nickel microstrip plating and a single layer design that allows integration into an aluminum housing with no long term reliability issues and low cost fabrication. As illustrated, on aluminum 602 housing can be fabricated with different designs and includes a ground layer 604 and a substrate 606 over the ground layer. A 50 ohm microstrip line 608 is formed such as by 0.0014 copper and 0.00015 nickel. A backshort 610 is formed as illustrated and includes a waveguide launch 612 as part of a probe 614. Ground vias 616 extend as isolation vias to aid in the transition. As illustrated, a gap 618 is formed above the microstrip, and operative with the backshort 610 and the probe 614 to form the low-loss waveguide launch. Waveguide flange holes 620 can receive fasteners or other necessary items for securing the housing to an appropriate device.

The substrate material can be formed from Rogers material 4350 and can have a thickness of about 20 mils. Via diameter can be about 20 mils. The height can be about 115 mils, length 98 mils, and width about 25 mils.

Figure 14C:
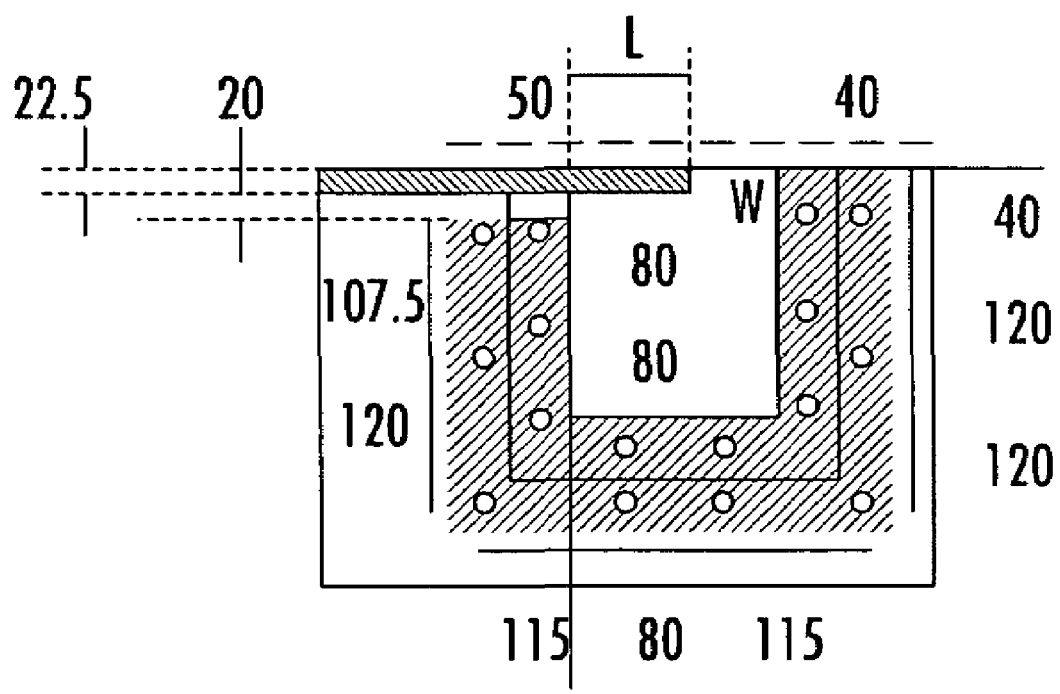
FIG. 14C is another top view of a low loss waveguide launch showing an example of dimensions and a different configuration.

FIG. 14C shows a non-limiting example of the various dimensions that can be used in one example. Naturally, other dimensions can also be used, depending on the types of material, the particular wavelengths and other factors.

Figure 16:
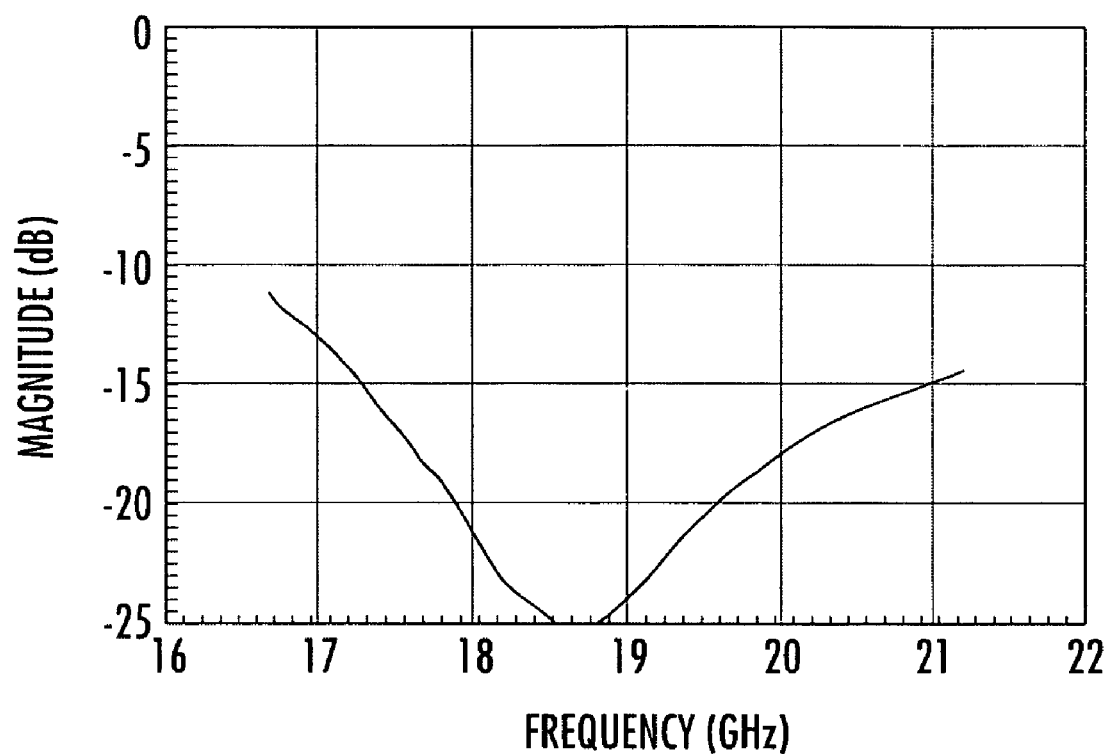
FIGS. 16 and 17 are graphs showing examples of the transition return loss and transition insertion loss.
Figure 17:
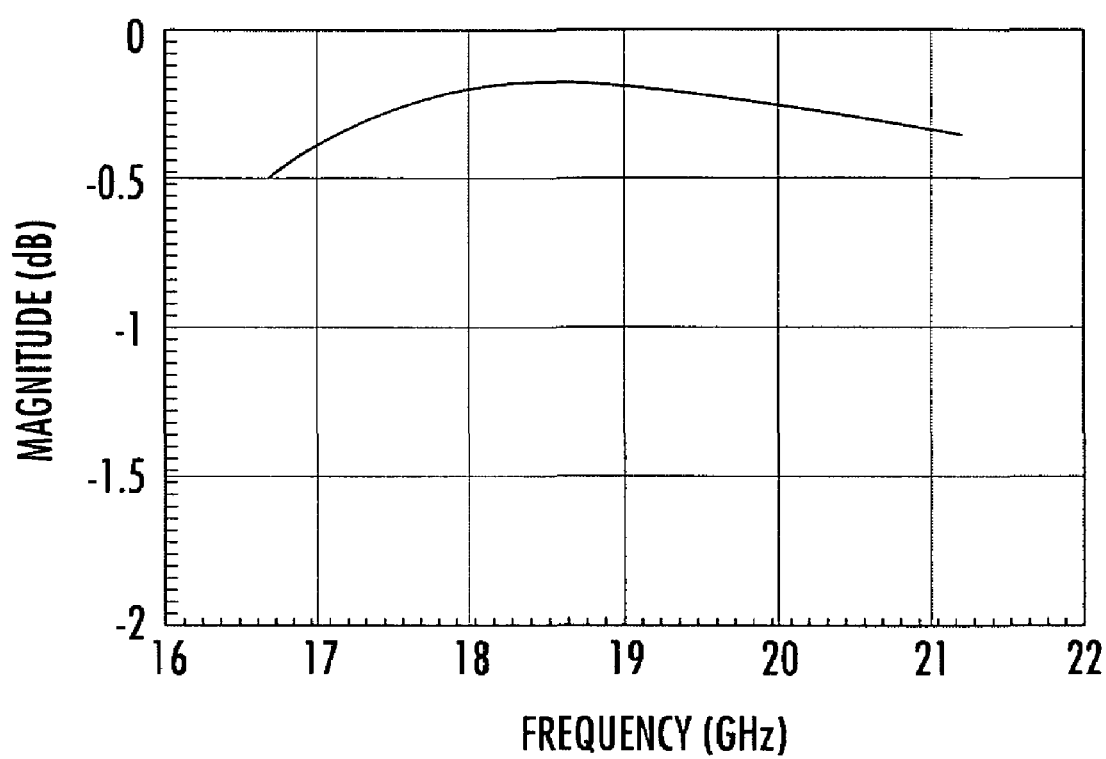

FIG. 16 is a graph illustrating an example of the transistor return loss and FIG. 17 is a graph showing the transition insertion loss. FIG. 14C has a different layout and shows added details.

FIG. 15 illustrates a subharmonically pumped mixer 650 that is designed for a single low cost package field effect transistor (FET) 652 and operable with the circuit above. A traditional mixer at these frequencies would probably use diodes in a balance configuration. Use of filters to reflect unwanted energies into the field effect transistor and a properly chosen matching network on the output leads to the unique properties of this mixer, allowing efficient usage of the available local oscillator (LO) signal without adding additional active devices. As illustrated, the local oscillator input signal is passed into a low pass filter 654 that rejects radio frequency signals with correct phasing. A bandpass filter 656 receives the radio frequency input and rejects the local oscillator signal with correct phasing. The field effect transistor 652 is connected to a gate bias circuit 658 and the drain bias circuit 660 and harmonic load circuit 662 with the intermediate frequency output.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A receiver operable at microwave frequencies comprising:
   a substrate;
   a waveguide-to-microstrip transition formed on the substrate for receiving microwave radio frequency (RF) signals;
   surface mounted receiver components and interconnecting microstrip formed on the substrate that receive the RF signals from the waveguide-to-microstrip transition and convert the signal to an intermediate frequency (IF) for further processing, and comprising
   a mixer circuit that receives a local oscillator (LO) signal and RF signal to produce the IF signal;
   a diplexer circuit and a temperature compensated attenuator circuit that receive the IF signal from the mixer and attenuates the IF signal to provide high signal linearity and high order modulation, wherein the diplexer circuit receives the IF signal from the mixer circuit and passes the signal to the temperature compensated attenuator circuit;
   a controller and temperature compensation circuit operatively connected to the temperature compensated attenuator circuit for temperature compensating any attenuation to the IF signal; and
   a receive signal strength indicator (RSSI) circuit that couples a portion of the IF signal after the diplexer and temperature compensated attenuator circuit and operatively connected to the controller and in feedback to the mixer circuit for allowing the controller to adjust circuit operation and ensure high signal linearity and high order modulation.

2. A receiver according to claim 1, and further comprising a gain equalizer circuit for receiving the IF signal from the temperature compensated attenuator circuit.

3. A receiver according to claim 1, and further comprising an amplifier circuit that amplifies the IF signal before passing through the diplexer circuit and temperature compensated attenuator circuit.

4. A receiver according to claim 1, and further comprising an amplifier circuit that receives the IF signal after passing through the diplexer circuit and temperature compensated attenuator circuit.

5. A receiver according to claim 1, wherein the waveguide-to-microstrip transition comprises a metallic housing, ground layer thereon, a substrate over the ground layer, and backshort and microstrip line operably formed as a waveguide launch.

6. A receiver according to claim 5, wherein the microstrip line further comprises copper having a thinner nickel layer on at least a portion of the copper.

7. A receiver according to claim 5, and further comprising ground vias that extend around the backshort to aid in the transition.

8. A receiver according to claim 1, wherein said receiver is operable as a VSAT transceiver.

9. A receiver operable at microwave frequencies comprising:
- a substrate;
- a waveguide-to-microstrip transition formed on the substrate for receiving microwave radio frequency (RF) signals;
- surface mounted receiver components and interconnecting microstrip formed on the substrate that receive the RF signals from the waveguide-to-microstrip transition and convert the signal to an intermediate frequency (IF) for further processing, and comprising
- a local oscillator circuit that generates a local oscillator (LO) signal,
- a low pass filter that receives the LO signal;
- a bandpass filter that receives the RF signal;
- a mixer circuit that receives the local oscillator (LO) signal from the low pass filter and the RF signal from the bandpass filter to produce the IF signal,
- a diplexer circuit and temperature compensated attenuator circuit that receive the IF signal from the mixer and attenuates the IF signal to provide high signal linearity and high order modulation, wherein the diplexer circuit receives the IF signal from the mixer circuit and passes the signal to the temperature compensated attenuator circuit;
- a controller and temperature compensation circuit operatively connected to the temperature compensated attenuator circuit for temperature compensating any attenuation to the IF signal; and
- a receive signal strength indication (RSSI) circuit that couples a portion of the IF signal after the diplexer and temperature compensated attenuator circuit and operatively connected to the controller for allowing the controller to adjust circuit operation and ensure high signal linearity and high order modulation.

10. A receiver according to claim 9, wherein said mixer circuit further comprises a Field Effect Transistor (FET) and gate bias circuit and a drain bias circuit connected thereto and forming a mixer output at the drain and connected to the dip/lexer circuit and temperature compensated attenuator circuit.

11. A receiver according to claim 9, wherein the surface mounted receiver components are operable as a harmonic load at the output of the Field Effect Transistor.

12. A receiver according to claim 9, and further comprising a gain equalizer circuit for receiving the IF signal from the temperature compensated attenuator circuit.

13. A receiver according to claim 9, and further comprising an amplifier circuit that amplifies the IF signal before passing through the diplexer circuit and temperature compensated attenuator circuit.

14. A receiver according to claim 9, and further comprising an amplifier circuit that receives the IF signal after passing through the diplexer circuit and temperature compensated attenuator circuit.

15. A receiver according to claim 9, wherein the waveguide-to-microstrip transition comprises a metallic housing, ground layer thereon, a substrate over the ground layer, and backshort and microstrip line operably formed as a waveguide launch.

16. A receiver according to claim 15, wherein the microstrip line further comprises copper having a thinner nickel layer on at least a portion of the copper.

17. A receiver according to claim 15, and further comprising ground vias that extend around the backshort to aid in the transition.

18. A receiver according to claim 9, wherein said receiver is operable as a VSAT transceiver.

* * * * *